(12) United States Patent
Andersson et al.

(10) Patent No.: US 8,670,488 B2
(45) Date of Patent: Mar. 11, 2014

(54) ADAPTIVE INTRA MODE SELECTION

(75) Inventors: Kenneth Andersson, Gavle (SE); Per Frojdh, Stockholm (SE); Clinton Priddle, Upplands Vasby (SE); Jonatan Samuelsson, Skarpnack (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 703 days.

(21) Appl. No.: 12/808,992

(22) PCT Filed: Jul. 31, 2008

(86) PCT No.: PCT/EP2008/006314
§ 371 (c)(1),
(2), (4) Date: Jun. 17, 2010

(87) PCT Pub. No.: WO2009/080133
PCT Pub. Date: Jul. 2, 2009

(65) Prior Publication Data
US 2010/0309977 A1    Dec. 9, 2010

Related U.S. Application Data

(60) Provisional application No. 61/016,036, filed on Dec. 21, 2007.

(51) Int. Cl.
*H04N 7/34* (2006.01)
*H04N 7/50* (2006.01)
*H04N 5/44* (2011.01)

(52) U.S. Cl.
USPC ............ 375/240.29; 375/240.13; 375/240.14

(58) Field of Classification Search
USPC .................... 375/240.13, 240.14, 240.25
See application file for complete search history.

(56) References Cited

U.S. PATENT DOCUMENTS

| 6,990,146 B2* | 1/2006 | Chen ................... 375/240.13 |
| 7,310,374 B2* | 12/2007 | Wang et al. ........... 375/240.16 |
| 7,830,960 B2* | 11/2010 | Liang et al. ........... 375/240.12 |
| 2003/0099293 A1* | 5/2003 | Okada et al. ........... 375/240.13 |
| 2003/0206594 A1 | 11/2003 | Zhou |
| 2004/0213348 A1 | 10/2004 | Kim et al. |
| 2008/0056363 A1* | 3/2008 | Lyashevsky et al. .... 375/240.13 |

FOREIGN PATENT DOCUMENTS

FR    2908007 A1    5/2008

OTHER PUBLICATIONS

ITU-T Recommendation H.264 (Mar. 2005).*

(Continued)

*Primary Examiner* — Dave Czekaj
*Assistant Examiner* — David N Werner
(74) *Attorney, Agent, or Firm* — Coats & Bennett, PLLC

(57) ABSTRACT

In video encoding and decoding predictions may be generated by intra-frame prediction. Intra-frame prediction uses reconstructed pixels in a reconstructed frame. Intra-frame prediction is performed by extending the reconstructed pixels into a predicted block using intra-frame prediction modes, each intra-frame prediction mode indicating a direction of the extension. In order to reduce the number of possible intra-frame prediction modes, a subset is selected from a predetermined set of possible intra-frame prediction modes. A subset of intra-frame prediction modes can be created by forming preselection sets of intra-frame prediction modes on the basis of similarity of their associated predicted blocks and selecting a representative intra-frame prediction mode from each preselection set.

32 Claims, 5 Drawing Sheets

(56) References Cited

OTHER PUBLICATIONS

T. Wiegand, H. Schwarz, A. Joch, F. Kossentini, & G.J. Sullivan, "Rate-Constrained Coder Control and Comparison of Video Coding Standards", 13 IEEE Trans. on Circuits & Sys. for Video Tech. 688-703 (Jul. 2003).*

Kim, C. et al. "Feature-Based Intra-Prediction Mode Decision for H.264." 2004 International Conference on Image Processing (ICIP), Piscataway, NJ, US, Oct. 24-27, 2004.

Pan, F. et al. "Fast Intra Mode Decision Algorithm for H.264/AVC Video Coding." 2004 International Conference on Image Processing (ICIP), Piscataway, NJ, US, Oct. 24-27, 2004.

Tsukuba, T. et al. "Adaptive Multidirectional Intra Prediction." ITU—Telecommunications Standardization Sector, Document VCDG-AG05, Study Group 16 Question 6, 33rd Meeting: Shenzhen, China, Oct. 20, 2007.

* cited by examiner

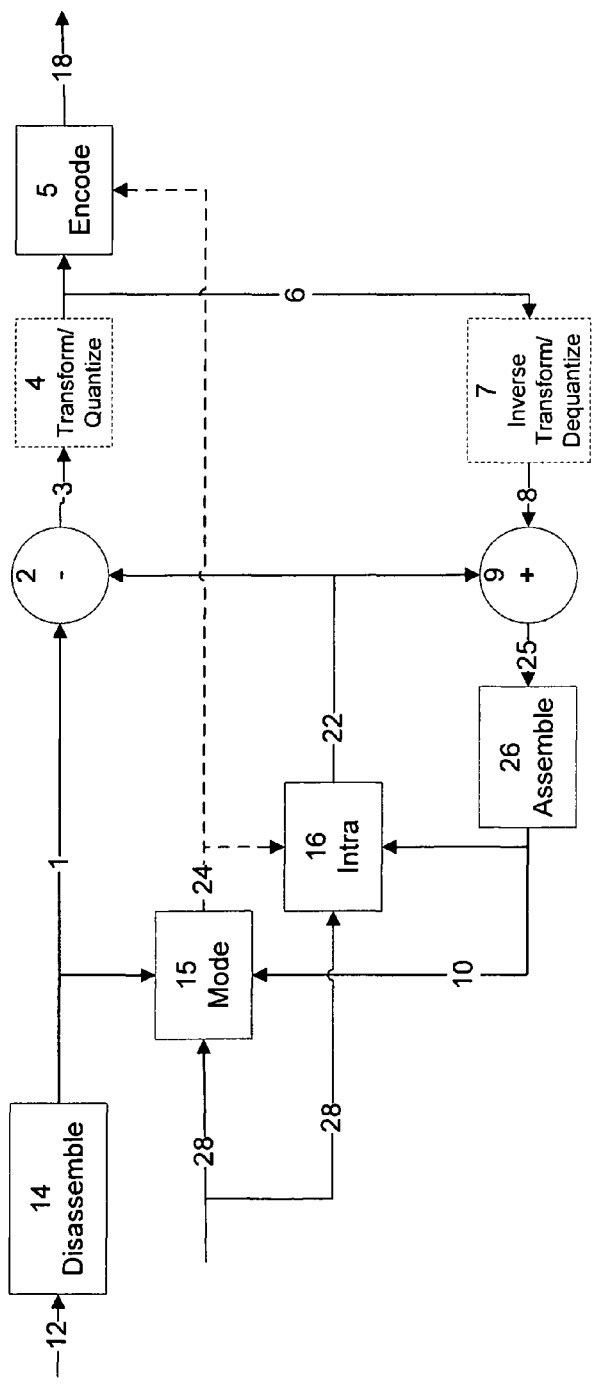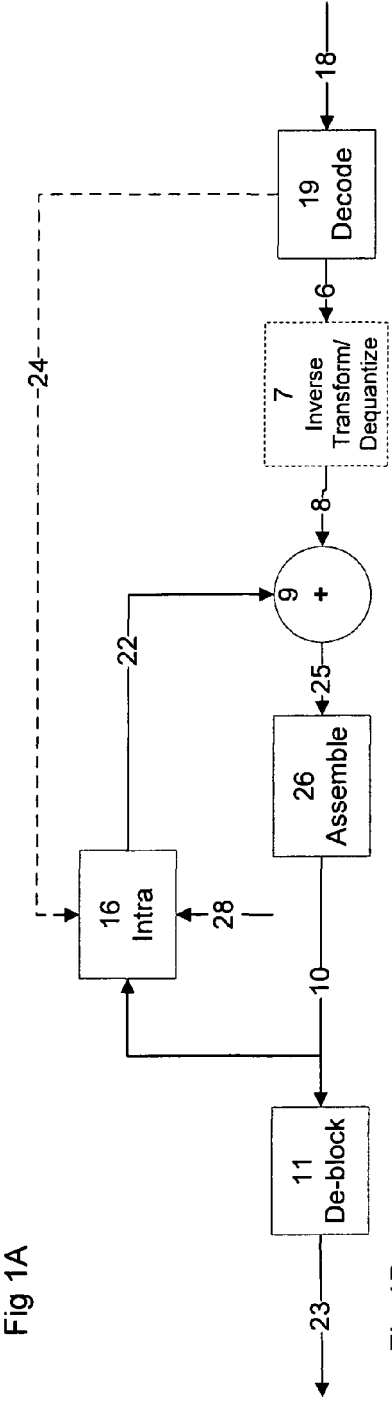
Fig 1A
Fig 1B

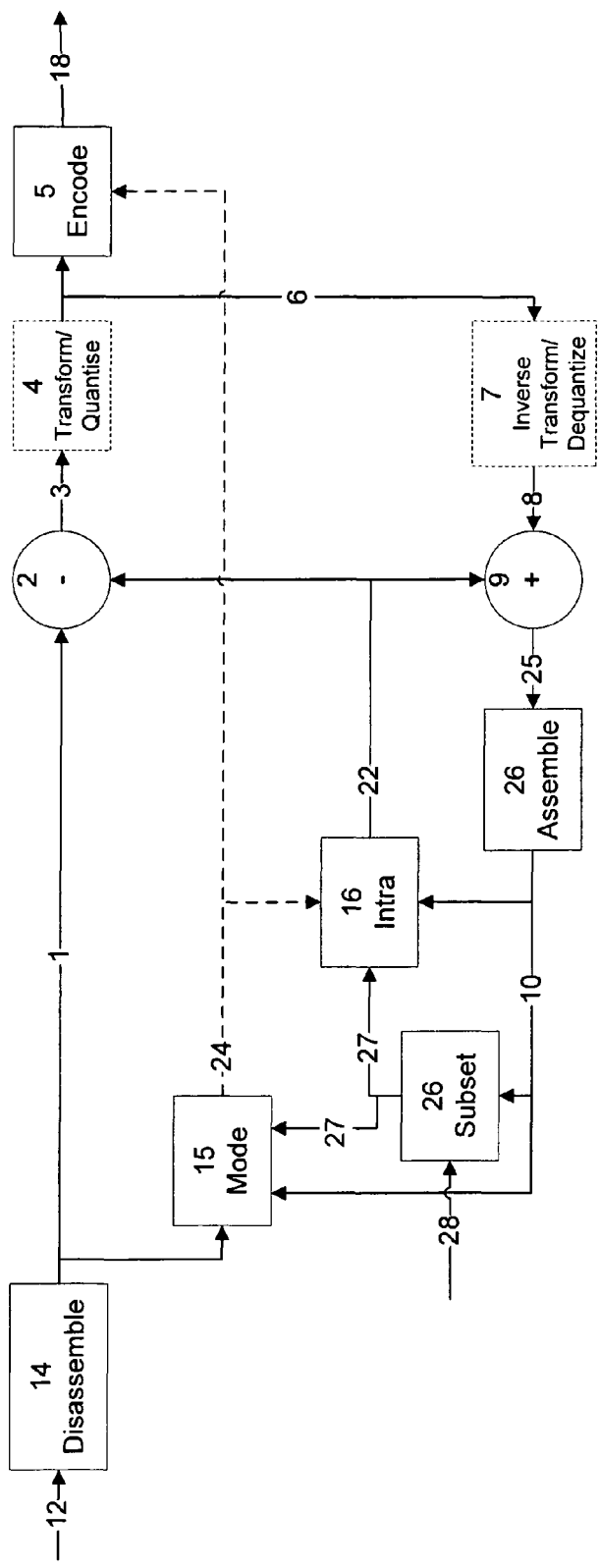
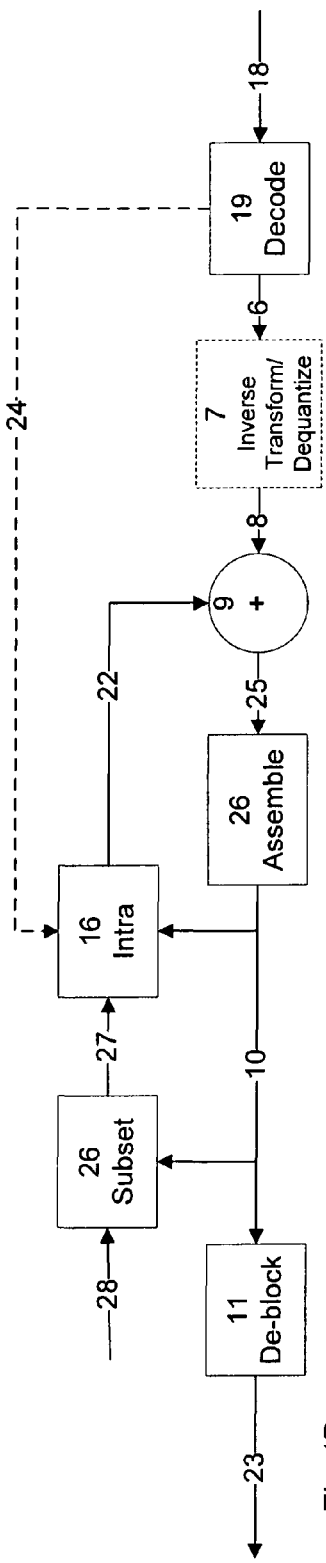
Fig 4A
Fig 4B

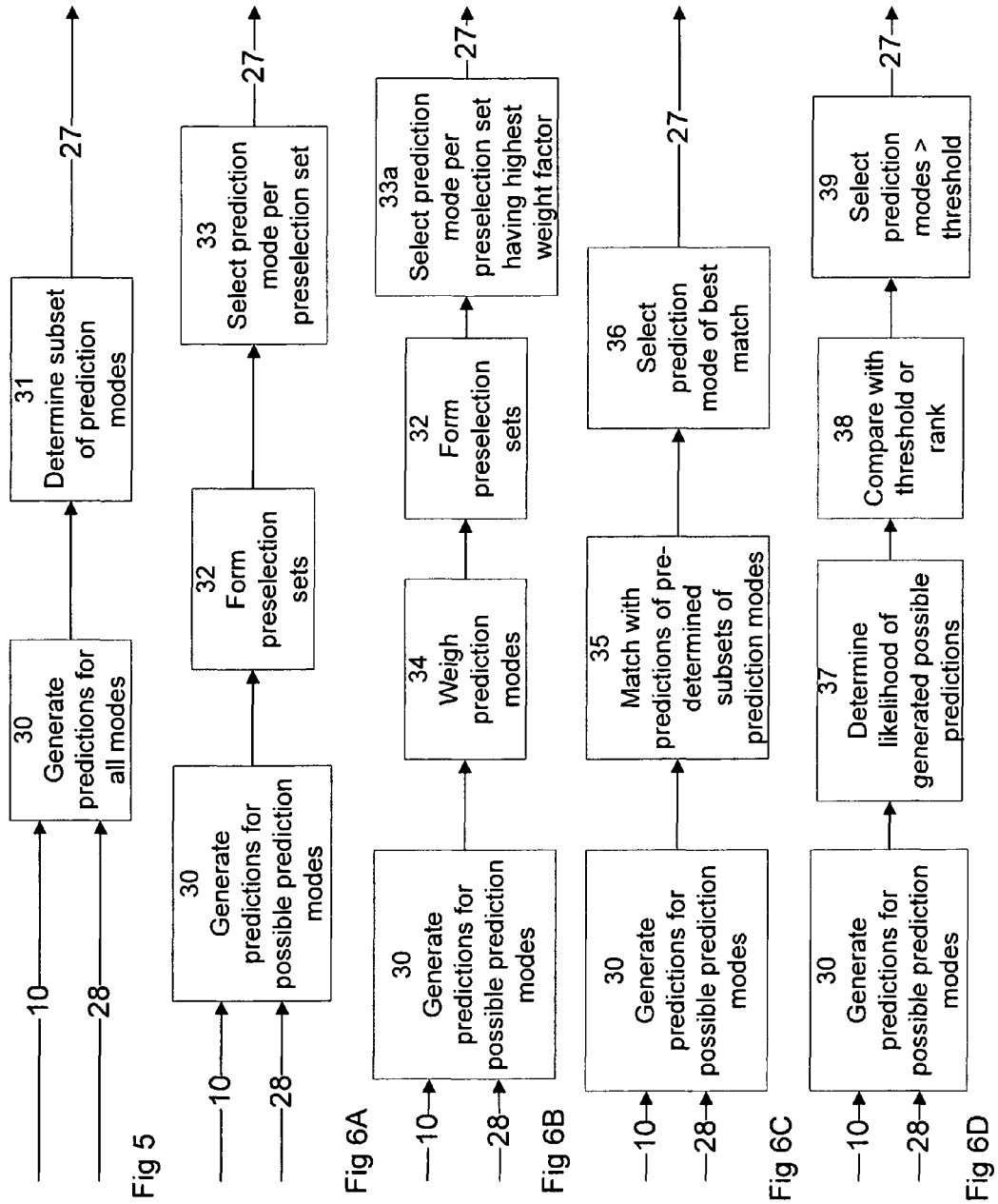

ADAPTIVE INTRA MODE SELECTION

FIELD OF THE INVENTION

The invention relates to a method of encoding a video frame into an encoded video frame, a method of video decoding an encoded video frame into a decoded video frame, a video encoding apparatus, a video decoding apparatus, a computer readable medium with a computer programme for a video encoding apparatus and a computer readable medium with a computer programme for a video decoding apparatus. The invention more specifically relates to video encoding and video decoding having intra-frame prediction.

BACKGROUND

A video encoding apparatus encodes in an encoding process input video frames into an encoded video frame for storage or transmission, to be used in a video decoding apparatus for reconstruction of the stored or transmitted signal in order to obtain a reconstruction of the original video signal. The encoding process enables compression of the original video signal such that the compressed video signal can be stored on a storage medium requiring storage having only a fraction of storage capacity that would be needed if the original input video frames would be stored or can transmit a video signal in a compressed way requiring only limited bandwidth compared to the bandwidth needed to transmit the original video signal.

In order to enhance the video encoding process, modern video encoding/decoding standards, such as H.264, use intra-frame prediction. In intra-frame prediction blocks of pixels are reconstructed using surrounding reconstructed pixels from a frame currently under reconstruction. Knowledge of surrounding pixels is used to create a prediction of a new block in an appropriate direction. More specifically, the surrounding pixels of this yet to be created block are extended in a given direction to create this block, for example by extrapolating in this direction. The direction is indicated by an intra-frame prediction mode. Predicted blocks generated by different intra-frame prediction modes may be evaluated according to selection criteria and a best intra-frame prediction mode may be selected. Once an intra-frame prediction mode is established, it will be coded and added to the encoded video frame.

In the art of video encoding/decoding intra-frame prediction is performed using a predetermined set of possible intra-frame prediction modes. This predetermined set of possible intra-frame prediction modes requires in the encoding process a number of bits to be coded when an intra-frame prediction mode from the predetermined set of possible intra-frame prediction modes is to be stored or transmitted to the decoding process.

The number of bits necessary to encode intra-frame prediction modes is determined by the number of possible intra-frame prediction modes. In many cases, not all possible intra-frame are needed to produce accurate or acceptable prediction results. Thus encoding bits are wasted on encoding intra-frame prediction modes resulting in identical or similar predictions, i.e. predicted blocks. It is therefore an object of the present invention to reduce the bit capacity required to encode intra-frame prediction modes.

SUMMARY OF THE INVENTION

The object is achieved according to a first aspect of the invention in a method of encoding an input video frame into an encoded video frame, comprising the steps of:
disassembling the input video frame into a plurality of blocks of pixels. For a current block of pixels from the plurality of blocks of pixels from the input video frame the following steps are performed:
  generating a predicted block corresponding to the current block from already reconstructed pixels of a current reconstructed frame using intra-frame prediction, wherein the step of generating the predicted block comprises generating an intra-frame prediction mode and generating the predicted block by applying the intra-frame prediction mode to the already reconstructed pixels of the current reconstructed frame;
  generating a residual block by subtracting the predicted block from the current block; and
  generating the current reconstructed frame from the residual block and the predicted block;
  generating the encoded video frame from the residual block,
  and wherein the step of generating a predicted block further comprises the step of: determining a subset of intra-frame prediction modes from the predetermined set of possible intra-frame prediction modes;
  and wherein the step of generating an intra-frame prediction mode is performed by selecting an intra-frame prediction mode from the subset of intra-frame prediction modes;
  and wherein the step of generating the predicted block is performed with reference to the subset of intra-frame prediction modes.

The object is also achieved according to a second aspect of the invention in a method of decoding an encoded video frame into an output video frame, comprising the steps of:
  generating a reconstructed residual block from the encoded video frame;
  generating a predicted block from already reconstructed pixels of a current reconstructed frame;
  generating the reconstructed frame from the reconstructed residual block and the predicted block;
  generating the predicted block from the current reconstructed frame and decoded intra-frame prediction mode;
  and wherein the step of generating the predicted block further comprises the step of determining a subset of intra-frame prediction modes from the predetermined set of possible intra-frame prediction modes; and wherein the step of generating the predicted block is performed with reference to the subset of intra-frame prediction modes.

By reducing the number of possible intra-frame prediction modes into the subset, the bit capacity required for encoding the intra-frame prediction modes is reduced, while maintaining the quality of the predicted blocks and therefore of the encoding process and subsequent decoding process.

In an embodiment according to the invention, the step of determining a subset of intra-frame prediction modes from the predetermined set of possible intra-frame prediction modes comprises orming at least one preselection set of intra-frame prediction modes from the predetermined set of possible intra-frame prediction modes on the basis of a similarity criterion of generated predicted blocks associated with the prediction modes from the predetermined set of possible intra-frame prediction modes, and for each of the at least one preselection set selecting an intra-frame prediction mode into the subset of intraframe prediction modes.

This allows intra-frame prediction modes to be grouped together into preselection sets on the basis of the similarity criterion applied to a characteristic of corresponding predicted blocks, whereby an intra-frame prediction mode can be selected per preselection set. The selection of the intra-frame prediction mode per preselection set may involve selection of the intra-frame prediction mode having a corresponding predicted block with highest similarity score of the associated predicted block.

In another embodiment according to the invention, the methods above further comprise the step of adjusting the similarity criterion to establish a predetermined number of the at least one preselection sets.

This allows for tuning the grouping and selection process of predicted modes to find a balance between the bits to be encoded for encoding the intra-frame prediction modes and optionally a quantization step in the encoding process. The more stringent the similarity criterion, the more preselection sets will be created, and vice versa. Moreover, the more preselection sets are created the more bit-capacity is required to be coded.

In another embodiment according to the invention, the step of determining a subset of intra-frame prediction modes from the predetermined set of possible intra-frame prediction modes comprises:

determining for each of the predetermined set of possible intra-frame prediction modes a likelihood of the associated predicted block, and performing at least one of the steps of:
selecting intra-frame prediction modes having a likelihood of the associated prediction higher than a predetermined threshold value into the subset of intra-frame prediction modes; and
ranking the predetermined set of possible intra-frame prediction modes on the basis of the determined likelihood and selecting a predetermined number of the top ranked intra-frame prediction modes into the subset.

This allows for local optimization of the forming of preselection sets and selection process of predicted modes, since the likelihood of the occurrence of an intra-frame prediction mode may vary from video frame to video frame or within a video frame.

In another embodiment according to the invention the step of determining a subset of intra-frame prediction modes from the predetermined set of possible intra-frame prediction modes comprises:

for each possible intra-frame prediction mode from the predetermined set of possible intra-frame prediction modes determining a pixel variation in the associated surrounding pixels and performing at least one of the steps of:
selecting intra-frame prediction modes having a pixel variation in the associated surrounding pixels greater than a threshold value; and
ranking the predetermined set of possible intra-frame prediction modes on the basis of the determined pixel variation in the associated surrounding pixels and selecting a predetermined number of the top ranked intra-frame prediction modes into the subset.

The surrounding block is the block of reconstructed pixels in the current reconstructed frame from which the predicted block originates. By applying an intra-frame prediction mode to the associated surrounding pixels the predicted block is generated. This embodiment allows for the intra-frame prediction modes to be selected in the subset of possible intra-frame prediction modes of which the originating surrounding blocks have a pixel variation above a threshold, whereas predictions having a pixel variation below the threshold are ignored.

In another embodiment according to the invention the step of determining a subset of intra-frame prediction modes from the predetermined set of possible intra-frame prediction modes further comprises assigning a weight factor to each of the possible intra-frame prediction modes, and wherein the step of for each of the at least one preselection set selecting an intra-frame prediction mode into the subset of intraframe prediction modes comprises selecting an intra-frame prediction mode having a highest weight factor.

This allows for biasing the selection of intra-frame prediction modes into the subset of intra-frame prediction modes from the predetermined set of possible intra-frame prediction modes having a priori preference.

In another embodiment according to the invention the step of determining a subset of intra-frame prediction modes from the predetermined set of possible intra-frame prediction modes comprises matching possible intra-frame prediction modes with a plurality of predetermined sets of intra-frame prediction modes and selecting a set having a best match from the plurality of predetermined sets of intra-frame prediction modes.

This allows selection of a predetermined optimised subset of intra-frame prediction modes depending on conditions in the input video frame to be encoded. Since the subsets are predetermined, they need not be encoded. Thus a further reduction in bit capacity required in the encoding process of video frames can be achieved.

The object is also achieved according to a third aspect of the invention in an encoding apparatus comprising means for receiving an input video frame, means for outputting an encoded video frame, the encoding apparatus further comprising at least one of a combination of a processing means and a memory, and a combination of processing means and a memory and dedicated hardware means, and dedicated hardware means, arranged for performing the steps of the method of encoding an input video frame into an encoded video frame as described above.

The object is also achieved according to a fourth aspect of the invention in a decoding apparatus comprising means for receiving an encoded video frame, means for outputting a decoded video frame, the decoding apparatus further comprising at least one of a combination of a processing means and a memory, and a combination of processing means and a memory and dedicated hardware means, and dedicated hardware means, arranged for performing the steps of the method of decoding an encoded video frame into an output video frame.

The object is also achieved according to a fifth aspect of the invention in a computer readable medium having stored thereon computer instructions which, when loaded into a memory and processed by the processing means of the encoding apparatus, perform the steps of the method of encoding an input video frame into an encoded video frame as described above.

The object is also achieved according to a sixth aspect of the invention in a computer readable medium having stored thereon computer instructions which, when loaded into a memory and processed by the processing means of the decoding apparatus, perform the steps of the method of decoding an encoded video frame into an output video frame.

BRIEF DESCRIPTION OF THE DRAWINGS

The invention will be set out in the detailed description with reference to the following drawings, wherein:

FIG. 1A shows a block diagram for an exemplary process of encoding an input video frame into an encoded video frame having intra-frame prediction according to the state of the art.

FIG. 1B shows a block diagram for an exemplary process of decoding an encoded video frame into a decoded video frame having intra-frame prediction according to the state of the art.

FIG. 4A shows a block diagram for a process of encoding an input video frame into an encoded video frame according to an embodiment of the invention.

FIG. 4B shows a block diagram for a process of decoding an encoded video frame into a decoded video frame according to an embodiment of the invention.

FIG. 5 shows a block diagram according to an embodiment of the invention.

FIG. 6A shows a block diagram of a further embodiment according to the invention of FIG. 5.

FIG. 6B shows a block diagram of a further embodiment according to the invention of FIG. 5.

FIG. 6C shows a block diagram of a further embodiment according to the invention of FIG. 5.

FIG. 6D shows a block diagram of a further embodiment according to the invention of FIG. 5.

DETAILED DESCRIPTION OF THE INVENTION

Figure 2:
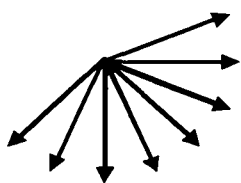
FIG. 2 shows an example of a graphical representation of a set of intra-frame prediction modes according to the state of the art.

The invention will be explained in detail below by exemplary embodiments and will be better understood if read with reference to the accompanying figures. Through the figures each block represents a processing step having data and/or control information as input and/or output. Data are represented by solid arrows and can be a block or a frame of pixels. Control information is represented by dashed arrows. Through the figures like reference numerals are used for like features.

Each of the blocks in the figures representing process steps may however also be implemented in dedicated hardware processors. Likewise data and control information may be implemented in hardware as electronic signals, used for communicating between and controlling the various hardware processors respectively.

Video encoding and decoding can be performed in two associated processes or methods to enable digital communication of video frames having a reduced bandwidth or bit-rate with respect to unencoded digital video transmission and/or requiring a limited amount of intermediate storage. The general concept of video encoding is based upon disassembling input video frames into blocks of pixels of various sizes, e.g. 4×4, 8×8 or 16×16, whereby a difference or residual block is generated by subtracting a predicted block from a current block of the input video frame. The residual block is encoded into an encoded video frame. In the encoding step additionally prediction information may be included to inform the corresponding decoding process. The residual block is used to create a reconstructed block from the predicted block and the residual block, which is assembled together with previously reconstructed blocks into a current reconstructed frame from which the predicted block is generated.

The predicted block can be established in various ways using information from previously encoded video frames, such as motion, texture, edges, etc. In intra-frame prediction, an intra-frame prediction mode is established which determines how a predicted block can be generated from the current reconstructed frame. The intra-frame prediction mode can be encoded as prediction information together with the residual block as indicated above.

In the corresponding decoding process, similar to the encoding process, a reconstructed frame is generated from which a predicted block is generated. The encoded video frame is decoded into a decoded block which represents the residual block of the encoding process, and an intra-frame prediction mode which represents the prediction mode of the encoding process.

The intra-frame prediction mode together with the current reconstructed frame allow the decoding process to generate a predicted block identical to the predicted block in the encoding process. The predicted block is added to the decoded block representing the residual block, generating a reconstructed block which by assembling with previously reconstructed blocks forms the current reconstructed frame. After optionally de-blocking the reconstructed frame can be output as a decoded video frame. De-blocking allows visible or otherwise disturbing or superfluous transitions in the constituting blocks of the reconstructed frame to be smoothed or removed.

FIG. 1A shows a block diagram of an exemplary process of encoding an input video frame 12 having intra-frame prediction according to the state of the art (H.26×, MPEG-2, MPEG-4), wherein the input video frame 12 is disassembled 14 in a plurality of blocks 1, whereby a disassembled current block 1 is successively processed in a processing cycle.

Current block 1, one of the disassembled generated blocks from the input video frame 12, is encoded into an encoded video frame 18, which is to be transmitted to a corresponding decoding process as depicted in FIG. 1B. Thus, input video frame 12 is blockwise encoded and transferred to the decoding process. It is clear that by consecutively encoding input video frames 12, streaming video can be encoded into a continuous encoded video frame 18. Intermediate storage can be performed between encoding and decoding in encoded form, such as for example on a Compact Disc (CD) or Digital Versatile Disc (DVD) or any other storage medium.

In FIG. 1A, in a cycle of the encoding process, for current block 1, a predicted block 22 is used to generate a residual block 3 by subtracting 2 the predicted block 22 from the current block 1. The step of subtracting 2 can be performed by pixelwise subtracting pixel values, the result of which is written in the residual block. The residual block 3 is optionally transformed 4 into a transformed block, which in turn is encoded 5, to generate the encoded digital video frame 18. The optional step of transforming 4 residual block 3 into a transformed block 6 may involve for example Discrete Cosine Transformation (DCT). The step of transforming/quantizing 4 of the residual block 3 may additionally involve quantization of the resulting transformed block to limit the number of possible values of the transformed residual block 6. This will reduce the workload of the encoding step 5. Encoding 5 may involve entropy coding, i.e. for example Huffman-coding or any other coding scheme for reducing the amount of bits required for digital transmission. In FIG. 1A the transforming/quantizing step 4 is shown with dashed lines since it is optional. If the transform/quantizing step 4 is omitted, the transformed residual block 6 equals the residual block 3.

The transformed block 6 is optionally inverse transformed and/or dequantized 7 into a reconstructed residual block 8. It will be clear that the step of inverse transforming the transformed residual block 6 is only performed if the step of transforming/quantizing 4 of the residual block 3 is performed. So if the step of transforming/quantizing 4 of the residual block 3 is not performed, the reconstructed residual block 8 equals the residual block 3. In the remaining description, it is assumed that a form of transformation and/or quantization in step 4 and inverse transformation and/or dequantization 7 is in place.

The reconstructed, optionally inverse transformed/dequantized, residual block 8, representing the residual block 3, is then added 9 to generate a reconstructed block 25. Adding may be performed by pixelwise adding pixel values and putting the result in the reconstructed block 25. This reconstructed block 25 is assembled 26 together with previously reconstructed blocks 25 to form at least part of a current reconstructed frame, which can thus be used for intra-frame prediction in the next cycle. In the example of a process of video encoding as shown in FIG. 1A generating 15, 16 a predicted block 22 is limited to intra-frame prediction only. Additionally other prediction methods may apply, such as inter-frame prediction.

Intra-frame prediction according to the state of the art is performed by selecting an intra-frame prediction mode from a predetermined set of possible prediction modes 28 in step 15. Intra-frame prediction modes will be discussed in relation with FIG. 2. The selected intra-frame prediction mode 24 is used for generating 16 the predicted block 22 with reference to the predetermined set of possible intra-frame prediction modes 28. This predicted block 22 is used in generating the residual block 3 and the reconstructed block 25.

Intra-frame prediction mode 24, used for generating 16 the predicted block 22 is also encoded 5 into the encoded video frame 18 for further use in the decoding process.

FIG. 1B shows a process of decoding an encoded video frame 18 into a decoded video frame 23. The encoded video frame 18 is decoded into a decoded residual block 6 and an intra-frame prediction mode 24. The decoded residual block 6 is optionally inverse transformed/dequantized 7 into an reconstructed, optionally inverse transformed/dequantized, residual block 8. The inverse transformation/dequantization is performed in the decoding process if the transformation/dequantization in the encoding process is performed. So if the inverse transformation/dequantization 7 is not applied, the optionally inverse transformed/dequantized residual block 8 equals the decoded residual block 6. The reconstructed, optionally inverse transformed/dequantized, residual block 8 is added to a predicted block 22.

Predicted block 22 is generated 16 by applying the intra-frame prediction mode 24 to previously reconstructed pixels from the current reconstructed frame 10, also with reference to the predetermined set of possible intra-frame prediction modes 28. By adding 9 the predicted block 22 to the reconstructed, optionally inverse transformed/dequantized, residual block 8, a reconstructed block 25 is created. Reconstructed block 25 is assembled 26 together with previously reconstructed blocks 25 into the current reconstructed frame 10.

After completion of the assembly 26 of the current reconstructed frame 10, an (optional) step of de-blocking 11 may be performed as described above on the reconstructed frame 10 resulting in decoded video frame 23. From FIGS. 1A and 1B it is clear that the generation of the current reconstructed frame 10 by adding 9 the predicted block 22 to the reconstructed, optionally inverse transformed/dequantized, residual block 8 resulting in reconstructed block 25 in the video encoding process and the video decoding process are similar.

FIG. 2 shows an example of a graphical representation of intra-frame prediction modes according to the state of the art. The prediction modes are represented by arrows, each arrow indicating a direction from where surrounding reconstructed pixels of the current reconstructed frame 10 are used to extend the surrounding previously reconstructed pixels into the predicted block.

Figure 3:
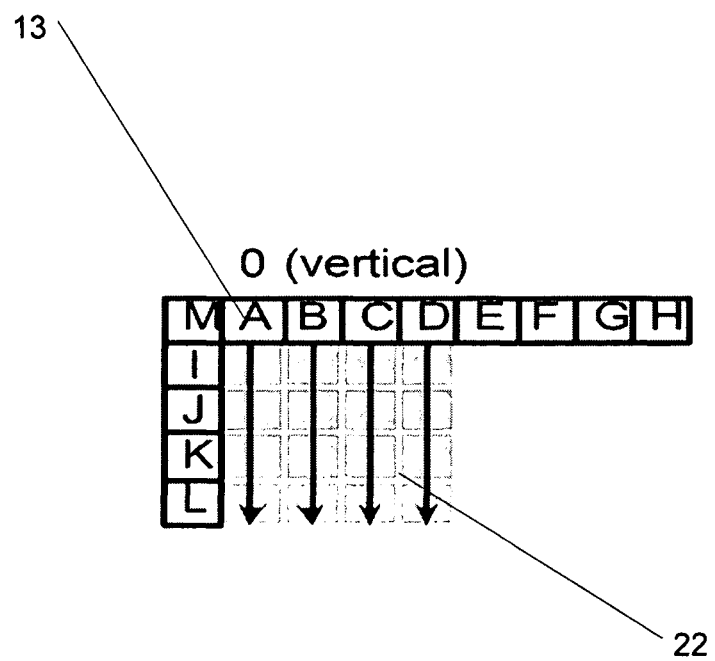
FIG. 3 shows an example of applying an intra-frame prediction mode to reconstructed pixels according to the state of the art.

In FIG. 3 an example is shown of applying an intra-frame prediction mode to surrounding reconstructed pixels 13 according to the state of the art. Previously reconstructed surrounding pixels 13 M, A, B, . . . , H are used to extend into the block 22 to be predicted, which is a 4×4 block in this example. By applying intra-frame prediction mode "0", well known in the art, pixels A, . . . , D are extended downwards into the pixels of predicted block 22. Intra-frame prediction mode 0 represents extension in downward direction.

Intra-frame prediction as shown in FIG. 3 uses a row of surrounding previously reconstructed pixels, however also column I, J, K, L could be used by extending to the right, or a combination of pixels in row A, . . . H and column M, . . . L. could be used extending in an intermediate direction. According to the standard H.264, 8 intra-frame prediction modes can be defined as shown in FIG. 2. Apart from extension of previously reconstructed pixels in a direction of an intra-frame prediction mode, also pixels of the predicted block 22 may be made equal to the average of surrounding previously reconstructed pixels 13, which is called DC-mode.

Intra-frame prediction can be enhanced by extending multiple rows and/or multiple columns of surrounding previously reconstructed pixels 13 into the predicted block 22. This allows for a larger number of predetermined intra-frame prediction modes.

FIG. 4A shows a block diagram of a process of encoding an input video frame 12 into an encoded video frame 18 according to an embodiment of the invention. The process of encoding an input video frame 12 into an encoded video frame 18 is similar to that of the process shown in FIG. 1A, however, a step of determining 21a subset of intra-frame prediction modes 27 from the predetermined set of possible intra-frame prediction modes 28 is added according to the invention. As discussed above the predetermined set of possible intra-frame prediction modes 28 can have a substantial number of intra-frame prediction modes. Thus, encoding an intra-frame prediction mode 24 requires a substantial number of bits to be encoded 5 accordingly. By reducing the number of intra-frame prediction modes into a subset of intra-frame prediction modes 27, the step of generating 15 an intra-frame prediction mode 24 can be limited to the subset of intra-frame prediction modes 27. Accordingly the step of generating 16 the predicted block 22, using the intra-frame prediction mode 24, can be limited to the subset of intra-frame prediction modes 27.

FIG. 4B shows a blockdiagram of a decoding process of an encoded video frame 18 into a decoded video frame 23 according to an embodiment of the invention. The process shown in FIG. 4B is likewise similar to the process decoding an encoded video frame 18 into a decoded video frame 23 according to FIG. 1B. As in the encoding process of FIG. 4A a step is added of determining 21a subset of intra-frame prediction modes 27 from the predetermined set of possible intra-frame prediction modes 28. Since the intra-frame prediction mode 24 does not have to be established in the decoding process, but is available via the decoding step 19, generation 16 of the predicted block 22 can be performed using the intra-frame prediction mode 24 and the subset of intra-frame prediction modes 27, as in the encoding process of FIG. 4A. Since the step of determining 21 the subset of intra-frame prediction modes 27 from the predetermined set of possible intra-frame prediction modes 28 is performed on current reconstructed frame 10 using the same steps of generating this current reconstructed frame 10, the subset of intra-frame prediction modes 27 in the encoding process is equal to the subset of intra-frame prediction modes 27 in the decoding process. This way it is ensured that the resulting predicted blocks 22 in the encoding process and the decoding process are the same and fewer bits are required for encoding and decoding the intra-frame prediction modes 24. Below the step of determining 21a subset of intra-frame prediction modes 27 from the predetermined set of possible intra-frame prediction modes is discussed in further detail.

In FIG. 5 a flow diagram is shown of determining 21 of a subset of intra-frame prediction modes 27 from a current reconstructed frame 10. A predetermined set of possible intra-frame prediction modes 28 is generated 30 by an intra-frame prediction strategy currently in place. This intra-frame prediction strategy may for example be determined by a video encoding/decoding standard such as H.264. For all possible prediction modes the corresponding predicted blocks 22 are generated 30. It is from these generated predicted blocks associated with all possible prediction modes 28 that a subset 27 is determined 31 according to various strategies and/or criteria as required or desired.

FIG. 6A shows a block diagram of a further embodiment according to the invention of FIG. 5. In this embodiment, after generating 30 predicted blocks 22 from the predetermined set of possible prediction modes 28 using the current reconstructed frame 10, the possible intraframe prediction modes are grouped by forming 32 preselection sets of intraframe prediction modes. Into the preselection sets intra-frame prediction modes are selected on the basis of similarity of their associated predicted blocks. Forming 32 preselection sets of intraframe prediction modes may be performed by comparing each predicted block 22 associated with an intraframe prediction mode with all other predicted blocks 22 generated in step 30. Comparing may for example involve for each block establishing a sum of squared differences of corresponding pixels of another block. Associated predicted blocks 22 having a summed squared difference less than a criterion, may result in that their prediction modes are made a member of a preselection set. Consequently preselection sets of prediction modes can be formed 32 having a similarity based on the summed squared differences of their associated predicted blocks. A person skilled in the art will recognize that methods of forming preselection groups other than using summed squared differences may be utilized.

Since the associated predicted blocks 22 in each preselection set are similar, only a single member, i.e. prediction mode, of the preselection set may be selected 33 to become a member of the subset of intra-frame prediction modes 27. By repeating this step for each preselection set, the subset of intra-frame prediction modes 27 can be completed.

An alternative method of forming 32 preselection sets from the generated 30 intra-frame prediction modes according to an embodiment of the invention can be described in the following steps:

1. Compare the predicted blocks 32 using Summed Squared Differences (SSD) as a measure of similarity.
2. The two predicted blocks 22 which are most similar are chosen as candidates for removal, and the one which is most similar to the others is removed.
3. Step 2 is repeated until a desired number of intra-frame prediction modes remain.
4. Select among the desired number of intra-frame prediction modes as selecting an intra-frame prediction mode according to the prior art, for example using rate-distortion.

The chosen intra-frame prediction mode out of the subset of intra-frame prediction modes 27 is then encoded 5 and signalled to the decoding process in the encoded video frame 18.

In a further embodiment of the invention, not shown in FIG. 6A, the similarity criterion may be adjusted such that a subset of intra-frame prediction modes 27 is created having a predetermined number of intra-frame prediction modes, less than the number of intra-frame prediction modes in the predetermined set of possible intra-frame prediction modes. The criterion and the subsequent number of intra-frame prediction modes in the subset of intra-frame prediction modes 27 may be tuned in relation to a quantization parameter used in the step of transforming/quantizing 4.

The higher the quantization parameter, the more "rounding" is done on the transformed pixels in the residual blocks 3. This results in less bits being used on the residual blocks 3 than with low quantization parameters. In terms of rate-distortion, well known in the field of information theory (Shannon theorem), the bit cost for encoding the residual block 3 is higher for low quantization parameters and lower for high quantization parameters. With the similarity criterion and subsequently the number of intra-frame prediction modes in the subset of intra-frame prediction modes 27 tuned to the quantization parameter used, the cost of bits is higher with low quantization parameters, so less bits can be afforded to be spent on an increased number of intra-frame prediction modes and vice versa.

For example, while maintaining the same bit-rate at a low quantization parameter, resulting in more bits for encoding residual block 3, two bits may be used to encode four possible prediction modes. At a high quantization parameter, resulting in few bits for encoding residual block 3, four bits may be used to encode sixteen possible prediction modes. This is also applicable when different modes use different amounts of bits. At high quantization parameters, the cheapest intra-frame prediction modes use few bits. At high quantization parameter levels it may be desirable to have more expensive prediction modes in exchange for a lower average cost. This intra-frame prediction mode/quantization parameter link may be used independently or combined with other embodiments of the invention.

In the decoding process the same steps are performed for establishing the subset of intra-frame prediction modes. The encoded intra-frame prediction mode from the encoding process is decoded 19 and used in generating 16 the predicted block selecting the intra-frame prediction mode from a subset of intra-frame prediction modes 27 according to the decoded intra-frame prediction mode 24.

FIG. 6B shows a block diagram of a further embodiment according to the invention of FIG. 6A. All possible intra-frame prediction modes 28 need not have the same relevance. Some intra-frame prediction modes may be more relevant than others, implying that such intra-frame prediction modes should have a higher priority while selecting intra-frame prediction modes in the subset of intra-frame prediction modes 27. This may be resolved in assigning 34 a weight factor to each of the predetermined set of possible intra-frame prediction modes 28, which is used in the selection 33 of intra-frame prediction modes from the preselection sets as described under FIG. 6A, whereby an intra-frame prediction mode having a higher weight may be selected 33a with preference over an intra-frame prediction mode within the same preselection set having a lower weight factor.

FIG. 6C shows a block diagram of yet another embodiment according to the invention of FIG. 5. In this embodiment the generated predicted blocks 22 for all possible prediction modes may be matched 35 with a plurality of predicted blocks associated with a plurality of predetermined subsets of intra-frame prediction modes. The predetermined subset of intra-frame prediction modes having the best match is selected 36 as the subset of intra-frame prediction modes 27 to be used in the step of generating 16 the predicted block 22 from the current reconstructed frame 10.

Figure 7:
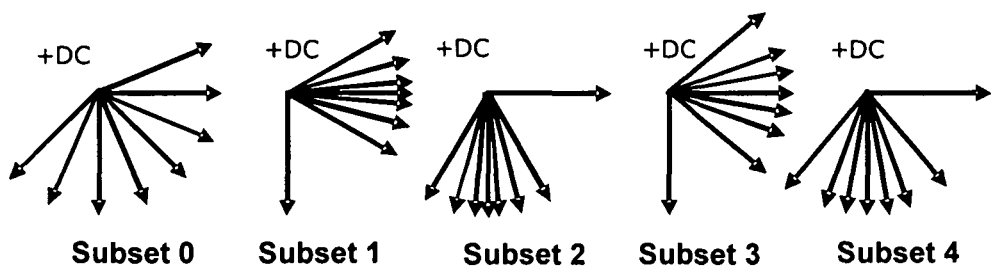
FIG. 7 shows an example of representations of predetermined sets of intra-frame prediction modes according to another embodiment of the invention.

FIG. 7 shows an example of predetermined subsets of intra-frame prediction modes according to an embodiment of the invention. If for example at a certain instance more directional predictions in horizontal direction are required, i.e. the predetermined set of possible intra-frame prediction modes have more of such modes, subset 1 of FIG. 7 may fit best and can be selected. Likewise if at a certain instance more directional predictions in vertical direction are required, i.e. the predetermined set of possible intra-frame prediction modes have more of such modes, subset 2 of FIG. 7 may fit best and can be selected.

FIG. 6D shows a block diagram of yet another embodiment according to the invention shown in FIG. 5. Intra-frame prediction modes in the predetermined set of possible intra-frame prediction modes 28 may be ranked 38 based upon likelihood or a threshold may be applied 38 to establish intraframe prediction modes having a likelihood more than the trhreshold. Likelihood of an intra-frame prediction mode can be established 37 on the basis of at least one of, and not limited to, previous decisions with respect to selected intra-frame prediction modes, frequencies of previous decisions, probability and other properties of surrounding pixels 13 in the current reconstructed frame 10. Intraframe modes which are judged as being likely are given a short code word in the encoding step 5, whereas intra-frame prediction modes being judged as unlikely are given long code words. The intra-frame prediction modes having a likelihood above a threshold value may be selected 39 into the subset of intra-frame prediction modes 27. Alternatively top ranking intra-frame prediction modes may be selected 39 into the subset 27.

In another embodiment according to the invention, not shown in the figures, pixel variation in the surrounding pixels 13 associated with each of the predetermined set of possible intra-frame prediction modes is determined. Intra-frame prediction modes having a pixel variation in the associated surrounding pixels 13 having a variation exceeding a threshold value may be selected in the subset of intra-frame prediction modes 27. Likewise, the intra-frame prediction modes from the predetermined set of possible intra-frame prediction modes may be ranked according to the pixel variation of the associated surrounding pixels 13. The highest ranking intra-frame prediction modes may be selected for the subset of intra-frame prediction modes 27. Pixel variation may be established with statistical methods such as establishing a variance of pixel values in a number of pixels.

Figure 8A:
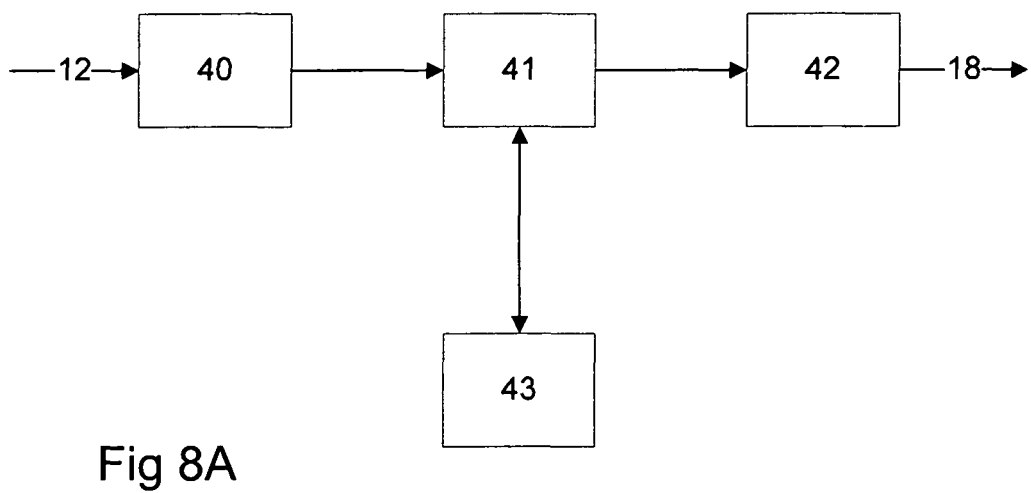
FIG. 8A shows a block diagram of an exemplary video encoder for encoding an input video frame into an encoded video frame according to the invention.

FIG. 8A shows a block diagram of an encoding apparatus according to an exemplary embodiment of the invention. An encoding apparatus generally comprises an input interface 40 for acquiring a input video frame 12, a processing means 41 and a memory 43 and/or dedicated hardware for video encoding, and an output interface 42 for outputting an encoded video frame 18.

The encoding apparatus can be comprised in, for example, a communication terminal such as a telephone or mobile phone or personal computer or any other device equipped with a camera, arranged for digital communication or storage of video captured with the camera or any other device for processing video frames. Furthermore devices for storing, transmitting or transcoding digitised video may apply.

An input video frame 12 as described can be received or acquired via input interface 40. Input video frames 12 may be received as an electronic video signal, in analog or digital form. In the case of receiving analog video signals, the input interface is equipped with an analog-to-digital converter. In the case of receiving a digital video signal the input interface is arranged accordingly, well known for an average person skilled in the art. The input video frame 12 may for example be received from a camera, camcorder, video player, CD-ROM/DVD player and the like.

The processing means 41 may comprise a microprocessor, DSP, microcontroller or any device suitable for executing program instructions and dedicated hardware. Dedicated hardware may comprise specialized integrated circuits, Field Programmable Gate Arrays and the like for performing some or all steps the steps of encoding the input video frames 12 as a whole or in part as shown in FIG. 4A.

The program instructions of the video encoding apparatus may be loaded into the memory 43 from a computer readable medium such as a CD-ROM, DVD, a hard disk, a floppy disc, or from any other medium having previously stored program instructions, via an appropriate interface according to the state of the art. The program instructions are arranged such that they, when executed by the processing means 41, perform the steps of encoding the input video frame 12 as described above.

The result of the encoding of the input video frame 12, the encoded video frame 18, may be output as a digital signal for transmission to another device for decoding, for storage or any other purpose via output interface 42 arranged for such purpose and well known to the average person skilled in the art.

Figure 8B:
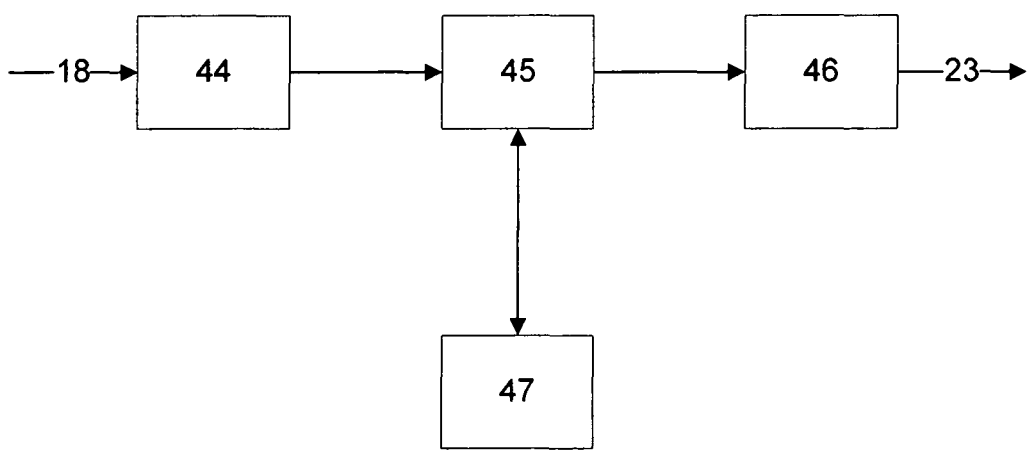
FIG. 8B shows a block diagram of an exemplary embodiment of a video decoder for decoding an encoded video frame into a decoded video frame according to the invention.

FIG. 8B shows a block diagram of a decoding apparatus according to an exemplary embodiment of the invention. A decoding apparatus generally comprises an input interface 44 for receiving an encoded video frame 18, processing means 45 and a memory 47 and/or dedicated hardware for video decoding, and an output interface 46 for outputting a decoded video frame 23.

The decoding apparatus can be, but is not limited to a communication terminal such as a telephone or mobile phone or personal computer or any other device equipped with a display, arranged for digital communication or display of encoded video. Furthermore devices for storing, receiving or transcoding digitised video or any other device for processing video frames may apply. The decoding apparatus may also be comprised in any one of such devices.

The input interface 44 is arranged for receiving the encoded video frame 18, which may be output from a video encoding apparatus and sent to the video decoding apparatus though a communication link, e.g. a wired or wireless connection. The encoded video frames 18 may also be output from any storage device known in the art, such as a CD-ROM, DVD, PC hard disk etc.

The processing means 45 may comprise a microprocessor, DSP, microcontroller or any device suitable for executing program instructions and dedicated hardware. Dedicated hardware may comprise specialized integrated circuits, Field Programmable Gate Arrays and the like for performing some or all steps the steps of decoding the encoded video frame 18 as a whole or in part as shown in FIG. 4B.

The program instructions of the video encoding apparatus may be loaded into the memory 47 from a computer readable medium such as a CD-ROM, DVD, a hard disk, a floppy disc, or from any other medium having previously stored program instructions, via an appropriate interface according to the state of the art. The program instructions are arranged such that they, when executed by the processing means 45, perform the steps of decoding the encoded video frame 18 as described above.

The result of the decoding process, the decoded video frame 23, may be output for display or any other purpose via decoder output interface 46. The decoded video frame 23 may be output as an analog video signal. For that purpose the output interface 46 may have a digital-to-analog converter.

It must be understood that the embodiments in the description and figures are given by way of example only and that modifications may be made without departing from the scope of the invention as defined by the claims below.

The invention claimed is:

1. A method of encoding an input video frame into an encoded video frame, the method comprising disassembling the input video frame into a plurality of blocks of pixels, and, for a current block of pixels:
   determining a subset of intra-frame prediction modes from a pre-determined set of possible intra-frame prediction modes based on comparing pixel values between different predicted blocks associated with different intra-frame prediction modes in the pre-determined set, the number of modes in the subset being fewer than the number of modes in the pre-determined set;
   selecting an intra-frame prediction mode from the subset;
   generating a predicted block as an intra-frame prediction of the current block, based on applying the selected intra-frame prediction mode to a partially reconstructed frame comprising an assembly of one or more previous blocks that have been reconstructed as if decoded;
   generating a residual block by subtracting the predicted block from the current block;
   encoding the residual block and an indication of the selected intra-frame prediction mode to generate the encoded video frame, the encoding of said indication being based on the number of intra-frame prediction modes in the subset; and
   refraining from signaling the determined subset to a decoding apparatus that independently determines that subset.

2. The method of claim 1, wherein determining the subset from the predetermined set comprises:
   generating, for each intra-frame prediction mode in the pre-determined set, a predicted block as an intra-frame prediction of the current block, based on applying that mode to the partially reconstructed frame;
   forming one or more preselection sets of intra-frame prediction modes from the predetermined set, forming any given preselection set as including prediction modes that generate similar predicted blocks according to a similarity criterion; and
   for each of the preselection sets, selecting an intra-frame prediction mode included in that set into the subset of intra-frame prediction modes.

3. The method of claim 2, wherein determining the subset from the predetermined set further comprises assigning a weight factor to each intra-frame prediction mode in the predetermined set, and wherein, for each of the preselection sets, selecting an intra-frame prediction mode into the subset comprises selecting an intra-frame prediction mode having a highest weight factor as compared to the weight factor of other prediction modes in that preselection set.

4. The method of claim 2, further comprising adjusting the similarity criterion to form a predetermined number of preselection sets.

5. The method of claim 1, wherein determining the subset from the predetermined set comprises determining for each intra-frame prediction mode in the predetermined set a likelihood of the associated predicted block, and performing at least one of:
   comparing the likelihood of the associated predicted block with a pre-determined threshold value, and selecting for inclusion in the subset the intra-frame prediction modes having a likelihood higher than the predetermined threshold value; and
   ranking the intra-frame prediction modes in the predetermined set on the basis of the determined likelihood, and selecting for inclusion in the subset a predetermined number of the top ranked prediction modes.

6. The method of claim 1, wherein determining the subset from the predetermined set comprises for each intra-frame prediction mode in the predetermined set, determining a pixel variation in the associated surrounding pixels, and performing at least one of:
   selecting intra-frame prediction modes having a pixel variation in the associated surrounding pixels greater than a threshold value; and
   ranking the intra-frame prediction modes in the predetermined set on the basis of the determined pixel variation and selecting for inclusion in the subset a predetermined number of the top ranked intra-frame prediction modes.

7. The method of claim 1, wherein determining the subset from the predetermined set comprises:
   matching the intra-frame prediction modes in the predetermined set with a plurality of predetermined subsets of intra-frame prediction modes; and
   selecting from the plurality of predetermined subsets a subset having a best match.

8. The method of claim 5, wherein determining for a given intra-frame prediction mode a likelihood of the associated predicted block comprises determining that likelihood on the basis of at least one of: previous decisions with respect to selected intra-frame prediction modes, and frequencies of said previous decisions.

9. A method of decoding an encoded video frame into an output video frame by successively decoding different blocks of pixels associated with the encoded video frame, the method comprising, for a current block:
   determining a subset of intra-frame prediction modes from a pre-determined set of possible intra-frame prediction modes based on comparing pixel values between different predicted blocks associated with different intra-frame prediction modes in the pre-determined set, the number of modes in the subset being fewer than the number of modes in the pre-determined set, wherein said determining comprises independently determining the subset without regard to any signaling of that subset from an encoding apparatus;
   decoding from the encoded video frame a residual block and an indication of an intra-frame prediction mode associated with the current block, the decoding of said indication being performed with reference to the determined subset;
   generating a predicted block as an intra-frame prediction of the current block, based on applying the intra-frame prediction mode associated with said indication to a partially reconstructed output frame comprising an assembly of one or more previous blocks that have been reconstructed; and reconstructing the current block by adding the predicted block to the residual block.

10. The method of claim 9, wherein determining the subset from the predetermined set comprises:

generating, for each intra-frame prediction mode in the pre-determined set, a predicted block as an intra-frame prediction of the current block, based on applying that mode to the partially reconstructed frame;

forming one or more preselection sets of intra-frame prediction modes from the predetermined set, forming any given preselection set as including prediction modes that generate similar predicted blocks according to a similarity criterion; and for each of the preselection sets, selecting an intra-frame prediction mode included in that set into the subset of intra-frame prediction modes.

11. The method of claim 10, wherein determining the subset from the predetermined set further comprises assigning a weight factor to each intra-frame prediction mode in the predetermined set, and wherein, for each of the preselection sets, selecting an intra-frame prediction mode into the subset comprises selecting an intra-frame prediction mode having a highest weight factor as compared to the weight factor of other prediction modes in that preselection set.

12. The method of claim 10, further comprising adjusting the similarity criterion to form a predetermined number of preselection sets.

13. The method of claim 9, wherein determining the subset from the predetermined set comprises determining for each intra-frame prediction mode in the predetermined set a likelihood of the associated predicted block, and performing at least one of:

comparing the likelihood of the associated predicted block with a pre-determined threshold value, and selecting for inclusion in the subset the intra-frame prediction modes having a likelihood higher than the predetermined threshold value; and ranking the intra-frame prediction modes in the predetermined set on the basis of the determined likelihood, and selecting for inclusion in the subset a predetermined number of the top ranked prediction modes.

14. The method of claim 9, wherein determining the subset from the predetermined set comprises for each intra-frame prediction mode in the predetermined set, determining a pixel variation in the associated surrounding pixels, and performing at least one of:

selecting intra-frame prediction modes having a pixel variation in the associated surrounding pixels greater than a threshold value; and ranking the intra-frame prediction modes in the predetermined set on the basis of the determined pixel variation and selecting for inclusion in the subset a predetermined number of the top ranked intra-frame prediction modes.

15. The method of claim 9, wherein determining the subset from the predetermined set comprises:

matching the intra-frame prediction modes in the predetermined set with a plurality of predetermined subsets of intra-frame prediction modes; and selecting from the plurality of predetermined subsets a subset having a best match.

16. The method of claim 13, wherein determining for a given intra-frame prediction mode a likelihood of the associated predicted block comprises determining that likelihood on the basis of at least one of: previous decisions with respect to selected intra-frame prediction modes, and frequencies of said previous decisions.

17. An encoding apparatus, comprising:

an input interface configured to receive an input video frame;

an output interface configured to output an encoded video frame; and one or more processing circuits and a memory configured to:

disassemble the input video frame into a plurality of blocks of pixels; and for a current block of pixels:

determine a subset of intra-frame prediction modes from a pre-determined set of possible intra-frame prediction modes based on comparing pixel values between different predicted blocks associated with different intra-frame prediction modes in the pre-determined set, the number of modes in the subset being fewer than the number of modes in the pre-determined set;

select an intra-frame prediction mode from the subset;

generate a predicted block as an intra-frame prediction of the current block, based on applying the selected intra-frame prediction mode to a partially reconstructed frame comprising an assembly of one or more previous blocks that have been reconstructed as if decoded;

generate a residual block by subtracting the predicted block from the current block;

encode the residual block and an indication of the selected intra-frame prediction mode to generate the encoded video frame, the encoding of said indication being based on the number of intra-frame prediction modes in the subset; and refrain from signaling the determined subset to a decoding apparatus that independently determines that subset.

18. The encoding apparatus of claim 17, wherein the one or more processing circuits and memory are configured to determine the subset from the predetermined set by:

generating, for each intra-frame prediction mode in the pre-determined set, a predicted block as an intra-frame prediction of the current block, based on applying that mode to the partially reconstructed frame;

forming one or more preselection sets of intra-frame prediction modes from the predetermined set, forming any given preselection set as including prediction modes that generate similar predicted blocks according to a similarity criterion; and for each of the preselection sets, selecting an intra-frame prediction mode included in that set into the subset of intra-frame prediction modes.

19. The encoding apparatus of claim 18, wherein the one or more processing circuits and memory are configured to determine the subset from the predetermined set by further assigning a weight factor to each intra-frame prediction mode in the predetermined set, and to, for each of the preselection sets, select an intra-frame prediction mode into the subset by selecting an intra-frame prediction mode having a highest weight factor as compared to the weight factor of other prediction modes in that preselection set.

20. The encoding apparatus of claim 18, wherein the one or more processing circuits and memory are further configured to adjust the similarity criterion to form a predetermined number of preselection sets.

21. The encoding apparatus of claim 17, wherein the one or more processing circuits and memory are configured to determine the subset from the predetermined set by determining for each intra-frame prediction mode in the predetermined set a likelihood of the associated predicted block, and performing at least one of:
  comparing the likelihood of the associated predicted block with a pre-determined threshold value, and selecting for inclusion in the subset the intra-frame prediction modes having a likelihood higher than the predetermined threshold value; and
  ranking the intra-frame prediction modes in the predetermined set on the basis of the determined likelihood, and selecting for inclusion in the subset a predetermined number of the top ranked prediction modes.

22. The encoding apparatus of claim 17, wherein the one or more processing circuits and memory are configured to determine the subset from the predetermined set by, for each intra-frame prediction mode in the predetermined set, determining a pixel variation in the associated surrounding pixels, and performing at least one of:
  selecting intra-frame prediction modes having a pixel variation in the associated surrounding pixels greater than a threshold value; and
  ranking the intra-frame prediction modes in the predetermined set on the basis of the determined pixel variation and selecting for inclusion in the subset a predetermined number of the top ranked intra-frame prediction modes.

23. The encoding apparatus of claim 17, wherein the one or more processing circuits and memory are configured to determine the subset from the predetermined set by:
  matching the intra-frame prediction modes in the predetermined set with a plurality of predetermined subsets of intra-frame prediction modes; and
  selecting from the plurality of predetermined subsets a subset having a best match.

24. The encoding apparatus of claim 21, wherein the one or more processing circuits and the memory are configured to determine for a given intra-frame prediction mode a likelihood of the associated predicted block by determining that likelihood on the basis of at least one of:
  previous decisions with respect to selected intra-frame prediction modes, and frequencies of said previous decisions.

25. A decoding apparatus, comprising:
  an input interface configured to receive an encoded video frame;
  an output interface configured to output a decoded video frame; and
  one or more processing circuits and a memory configured to decode the encoded video frame into the output video frame by successively decoding different blocks of pixels associated with the encoded video frame and to, for a current block:
    determine a subset of intra-frame prediction modes from a pre-determined set of possible intra-frame prediction modes based on comparing pixel values between different predicted blocks associated with different intra-frame prediction modes in the pre-determined set, the number of modes in the subset being fewer than the number of modes in the pre-determined set, wherein the one or more processing circuits and the memory independently determine the subset without regard to any signaling of that subset from an encoding apparatus;
    decode from the encoded video frame a residual block and an indication of an intra-frame prediction mode associated with the current block, the decoding of said indication being performed with reference to the determined subset;
    generate a predicted block as an intra-frame prediction of the current block, based on applying the intra-frame prediction mode associated with said indication to a partially reconstructed output frame comprising an assembly of one or more previous blocks that have been reconstructed; and
    reconstruct the current block by adding the predicted block to the residual block.

26. The decoding apparatus of claim 25, wherein the one or more processing circuits and memory are configured to determine the subset from the predetermined set by:
  generating, for each intra-frame prediction mode in the pre-determined set, a predicted block as an intra-frame prediction of the current block, based on applying that mode to the partially reconstructed frame;
  forming one or more preselection sets of intra-frame prediction modes from the predetermined set, forming any given preselection set as including prediction modes that generate similar predicted blocks according to a similarity criterion; and
  for each of the preselection sets, selecting an intra-frame prediction mode included in that set into the subset of intra-frame prediction modes.

27. The decoding apparatus of claim 26, wherein the one or more processing circuits and memory are configured to determine the subset from the predetermined set by further assigning a weight factor to each intra-frame prediction mode in the predetermined set, and to, for each of the preselection sets, select an intra-frame prediction mode into the subset by selecting an intra-frame prediction mode having a highest weight factor as compared to the weight factor of other prediction modes in that preselection set.

28. The decoding apparatus of claim 26, wherein the one or more processing circuits and memory are further configured to adjust the similarity criterion to form a predetermined number of preselection sets.

29. The decoding apparatus of claim 25, wherein the one or more processing circuits and memory are configured to determine the subset from the predetermined set by determining for each intra-frame prediction mode in the predetermined set a likelihood of the associated predicted block, and performing at least one of:
  comparing the likelihood of the associated predicted block with a pre-determined threshold value, and selecting for inclusion in the subset the intra-frame prediction modes having a likelihood higher than the predetermined threshold value; and
  ranking the intra-frame prediction modes in the predetermined set on the basis of the determined likelihood, and selecting for inclusion in the subset a predetermined number of the top ranked prediction modes, 30. The decoding apparatus of claim 25, wherein the one or more processing circuits and memory are configured to determine the subset from the predetermined set by, for each intra-frame prediction mode in the predetermined set, determining a pixel variation in the associated surrounding pixels, and performing at least one of:
  selecting intra-frame prediction modes having a pixel variation in the associated surrounding pixels greater than a threshold value; and
  ranking the intra-frame prediction modes in the predetermined set on the basis of the determined pixel variation and selecting for inclusion in the subset a predetermined number of the top ranked intra-frame prediction modes.

31. The decoding apparatus of claim 25, wherein the one or more processing circuits and memory are configured to determine the subset from the predetermined set by:
- matching the intra-frame prediction modes in the predetermined set with a plurality of predetermined subsets of intra-frame prediction modes; and
- selecting from the plurality of predetermined subsets a subset having a best match.

32. The decoding apparatus of claim 29, wherein the one or more processing circuits and the memory are configured to determine for a given intra-frame prediction mode a likelihood of the associated predicted block by determining that likelihood on the basis of at least one of:
- previous decisions with respect to selected intra-frame prediction modes, and frequencies of said previous decisions.

* * * * *